United States Patent Office 3,224,996
Patented Dec. 21, 1965

3,224,996
VINYL CHLORIDE RESINS PLASTICIZED WITH COPOLYMERS OF AN ACRYLATE AND EITHER ETHYLENE OR PROPYLENE
Clifford E. Balmer, Hatboro, Holland, Clarence A. Brown, Hatboro, and Melvin D. Hurwitz, Southampton, Pa., and James E. Masterson, Moorestown, N.J., assignors to Rohm & Haas Company, Philadelphia, Pa., a corporation of Delaware
No Drawing. Filed Nov. 14, 1962, Ser. No. 237,735
7 Claims. (Cl. 260—31.8)

This is a continuation-in-part of our application Serial No. 820,625, which was filed on June 16, 1959, and which was issued as U.S. Patent No. 3,089,897, on May 14, 1963.

The parent application disclosed our unique process for copolymerizing ethylene and an acrylate by which novel compounds are prepared. By the same process propylene and an acrylate are copolymerized to form similar compounds. The products of that process are especially useful as plasticizers for vinyl type compositions, particularly for the homopolymers and copolymers of vinyl chloride. By the term "acrylate," incidentally, as used generically in the parent application and throughout the specification and claims hereof, is meant both the esters of acrylic and methacrylic acid, both substituted and unsubstituted, unless one or the other is more specifically named. The term "homopolymers and copolymers of vinyl chloride," moreover, refers to polymers of vinyl chloride selected from the group consisting of homopolymers of vinyl chloride and copolymers of a major portion of (or at least 50%) vinyl chloride with an ethylenically unsaturated monomer copolymerizable therewith.

The plasticizer compounds, which are described in detail in the parent application, and which description is incorporated herein by reference, are fluid materials that are characterized by their exceptionally low molecular weight for the types of copolymers involved. They may generally be defined in the following terms:

(1) Molecular weight (ebulliometric); ranging between 500–1500.

(2) Viscosity ranges from H to $Z_5$ on the Gardner-Holdt scale (equivalent to 2–98.5 poises) when ethylene is the olefin employed, and from H to $Z_{10}$ (equivalent to 2–1066 poises) when propylene is copolymerized with the acrylate.

(3) Light color (characteristically 1, but in any event no more than 3, on the Gardner 1933 scale).

(4) Acid numbers generally below 1, but in any case no more than about 3.0.

(5) Molar ratio of ethylene to acrylic monomer ranging from 1.0 to 3.0, and a molar ratio of propylene to acrylic monomer ranging from 0.5 to 2.0, both depending on the acrylic monomer employed. The upper limit is a function of molecular weight, as expressed by the equations:

(A) moles of ethylene/mole of acrylic monomer $$= X + \frac{1}{4}\left(\frac{1500}{\text{molecular weight}}\right)$$

where X=1.75 for ethyl acrylate and methyl methacrylate, and X=2.25 for methyl acrylate; and (B) Moles of propylene/mole of acrylic monomer $$= X + \frac{1}{4}\left(\frac{1500}{\text{molecular weight}}\right)$$

where X=1.00 for ethyl acrylate and methyl methacrylate, and X=1.25 for methyl acrylate.

The broad and preferred ranges of the molar ratios of ethylene and propylene, respectively, to the acrylic monomer, and the molecular weight of the product obtained by any pair of the monomer and one of said olefins, can conveniently be ascertained from Table I which follows:

TABLE I

| | Ethylene-acrylate, mole ratio in product | Molecular weight |
|---|---|---|
| PART A | | |
| Methyl acrylate: | | |
| Broad range | 1.0–3.0 | 500–1,500 |
| Preferred range | 1.7–2.2 | 700–900 |
| Ethyl acrylate: | | |
| Broad range | 1.0–2.5 | 500–1,500 |
| Preferred range | 1.3–2.0 | 700–900 |
| Methyl methacrylate: | | |
| Broad range | 1.0–2.5 | 500–1,500 |
| Preferred range | 2.0–2.5 | 500–800 |
| | Propylene-acrylate, mole ratio in product | |
| PART B | | |
| Methyl acrylate: | | |
| Broad range | 0.5–2.0 | 500–1,500 |
| Preferred range | 1.0–1.5 | 500–800 |
| Ethyl acrylate: | | |
| Broad range | 0.5–1.75 | 500–1,500 |
| Preferred range | 0.75–1.25 | 500–800 |
| Methyl methacrylate: | | |
| Broad range | 0.5–1.75 | 500–1,500 |
| Preferred range | 0.75–1.25 | 500–800 |

Characteristically, the higher the amount of ethylene or propylene which is incorporated in the copolymer product, the lower must be the molecular weight for the material. Thus, in the copolymer formed from ethylene and methyl acrylate, an average molecular weight of about 500 is suitable for a composition in which the mole ratio of ethylene to methyl acrylate is 3.0; but this mole ratio must be reduced to 2.25 as an average molecular weight of 1500 is approached. Similarly, in the copolymer formed from propylene and methyl acrylate, an average molecular weight of about 500 is suitable for a composition in which the mole ratio of propylene to methyl acrylate is 2.0; but this mole ratio must be reduced to 1.50 as an average molecular weight of 1500 is approached. Recognition of these critical elements of the invention is made in the simple formula given above which relates the permissible upper limit of the olefin content to the molecular weight.

When employed as a plasticizer for vinyl type compositions these compounds give maximum performance if the acidity of the copolymers is kept low, preferably an acid number of no more than 3.0. This makes possible the obtainment of high volume resistivity when the plasticized product is used as an electrical insulator, for example.

The plasticizers are all liquid, and are generally light in color. Table II, which follows, summarizes the performance properties of a number of them, almost all being compounds whose preparations are individually described in examples set forth in the parent application, the remainder having been prepared by closely analogous methods. In each case 40 parts of the plasticizer was incorporated with 60 parts of polyvinyl chloride and 1 part of a stabilizer (co-precipitated barium cadmium laurate), on a weight basis, in accordance with a conventional manner for plasticizing such materials.

The test methods listed in Table II for determining the various properties of the polyvinyl chloride materials which were plasticized with the copolymers of the parent application are well known. However, for anyone not familiar with those methods they can readily be found in the publication entitled Plasticizers (Rohm & Haas Company, Philadelphia, Pennsylvania, 1954, at pages 66–70).

The performance properties identified in Table II give clear indication of the utility of the plasticized compositions of the present invention.

TABLE II
*Performance properties of plasticized polymeric vinyl chloride compositions*

| Plasticizer composition No. | Shore "A" hardness, 10 sec. | Torsional modulus ($T_{135,000}$), °C. | 90° C. soapy water extraction, percent | Hexane extraction, percent | Activated carbon volatility, percent loss |
|---|---|---|---|---|---|
| 1 | 76 | −19½ | 5.2 | 25.2 | 3.6 |
| 2 | 82 | −1 | 8.4 | 22.9 | 4.2 |
| 3 | 76 | −6 | 6.8 | 9.8 | 3.2 |
| 4 | 79 | −4½ | 12.7 | 8.6 | 4.5 |
| 5 | 83 | −3½ | 3.9 | 4.2 | 2.0 |
| 6 | 87 | +1½ | 5.5 | 6.5 | 2.1 |
| 7 | 77 | −18 | 6.2 | 22.6 | 5.6 |
| 8 | 77 | −17 | 11.9 | 12.0 | 4.4 |
| 9 | 79 | −10½ | 4.1 | 15.9 | 1.0 |
| 10 | 78 | −5 | 2.9 | 10.8 | 1.8 |
| 11 | 88 | −5½ | 5.0 | 31.8 | 2.9 |
| 12 | 87 | +4 | 11.7 | 16.5 | 3.4 |
| DOP* | 69 | −35 | 9 | 30 | 10 |
| DOP** | 66 | −31 | 8.8 | 30.9 | 7.3 |

Notes:
(a) * Dioctyl phthalate, a widely used commercial plasticizer, cited here as a reference for comparison of its properties with the properties of plasticizer compositions No. 1–9, 11 and 12 employing a polyvinyl chloride homopolymer resin.
(b) ** Used as a plasticizer for a vinyl chloride/vinyl acetate copolymer resin identical with the one employed with plasticizer composition No. 10.
(c) Following are the charges from which the plasticizer compositions were made in accordance with the method described generally, and in the examples specifically, in the parent application S.N. 820,625 (in which the abbreviations refer to the following: E=ethylene; P=propylene; EA=ethyl acrylate; MA=methylacrylate; and MMA=methyl methacrylate, t-PBA=tertiary butyl peracetate (75%), and d-t-BP=di-t-butyl peroxide (97%):
 (1) 300 g. EA, 420 g. E, and 63.4 g. t-PBA.
 (2) 250 g. MMA, 525 g. E, 125 g. cumene, 74.8 t-PBA (75%).
 (3) 300 g. EA, 420 g. E, 63.4 g. t-PBA.
 (4) 258 g. MA, 252 g. E, and 423 g. t-PBA.
 (5) 300 g. EA, 336 g. E, and 21.2 g. t-PBA.
 (6) 252 g. EA, 300 g. E, and 28 g. methyl ethyl ketone peroxide.
 (7) 300 g. EA, 420 g. E, 35.1 g. d-t-BP, and 150 g. hexane.
 (8) 344 g. MA, 560 g. E, 68.8 g. methyl propionate, and 84.5 g. t-PBA.
 (9) 300 g. EA, 420 g. E, 150 g. hexane, and 40.6 g. d-t-BP.
 (10) 430 g. EA, 384 g. E, and 1300 g. chlorobenzene.
 (11) 250 g. EA, 630 g. P, 125 g. Skellysolve C, and 79.1 g. d-t-BP. The resulting copolymer had a viscosity at 25° C. (G–H scale) of X, M.W.=772, P/EA ratio=1.16, acid No.=0.25, and color (Gardner scale)=1.
 (12) 215 g. MA, 630 g. P, 108 g. Skellysolve C, and 79.1 g. d-t-BP. The resulting copolymer had a viscosity at 25° C. (G–H scale) of $Z_4$, M.W.=684, P/EA ratio=1.19, acid No.=0.18 and color (Gardner scale)=1.

It was pointed out above that by keeping low the acid number of the ethylene or propylene-acrylate or methacrylate plasticizers used in the present invention, e.g. 3.0 or below, the products plasticized therewith have good volume resistivity. Such products also have advantages of greater compatibility and resistance to extraction by soapy water when compared with materials having higher acid contents. The improvement in volume resistivity is illustrated in Table III which follows:

TABLE III
[Volume resistivity (ohms-cm.×10$^{12}$)]

| Plasticizer Composition No.[1] | 1 | 2 | 9 | X[2] | Commercial polyesters[3] | DOP[4] |
|---|---|---|---|---|---|---|
| 90° C. dry | 3.2 | 6.7 | 1.2 | 0.10 | About 0.1 | 1.9 |
| 60° C. wet | 6.0 | 12.3 | 1.5 | 0.42 | do | 3.0 |

[1] Formulations of plasticizer compositions corresponding to the same numbers in the notes to Table II.
[2] X represents an ethylene acrylate copolymer (mole ratio, E/EA of 1.50; M.W.=743) which had an acid number of 11. It was not prepared in accordance with the invention of the parent application, Serial No. 820,625.
[3] Polyesters were well-known ester plasticizers from glycols and dibasic acids. They are cited for purposes of comparison with the volume resistivities of the compositions of Serial No. 820,625.
[4] DOP represents dioctyl phthalate and it is also cited for purposes of comparison.

DOP is considered a good electrical grade plasticizer, but it is too fugitive. Conventional polyesters, such as polypropylene sebacates, are, on the other hand, poor in electrical properties though they have good permanence. By comparison, as indicated above, the plasticized compositions of the present invention are very useful because they have better permanence and equivalent or superior electrical properties than similar polymers that are plasticized with DOP.

Another exceptional property of the novel ethylene or propylene-acrylate or methacrylate copolymer plasticized polyvinyl chloride compositions of the present invention is their excellent resistance to microorganisms. Normally, plasticized vinyl products are subject to attack by bacteria and fungi, but such is not the case with the present products. This improvement is illustrated in the following examples.

EXAMPLE

An ethylene/ethyl acrylate (1:1) copolymer, made in accordance with the method disclosed in U.S. Ser. No. 820,625, was employed as a plasticizer for a polyvinyl chloride homopolymer. This polymer had an approximate molecular weight of 800 and a Gardner-Holdt viscosity of V+. It was prepared without any solvent. The plasticized product was placed in contact with a mineral salts agar nutrient medium having the following composition:

| | | |
|---|---|---|
| Ammonium nitrate | grams | 3.0 |
| Potassium dihydrogen phosphate | do | 1.0 |
| Magnesium sulfate | do | 0.5 |
| Potassium chloride | do | 0.25 |
| Agar | do | 15.0 |
| Distilled water | mls | 1000 |

The inoculum was selected from the following mixture of fungi, and tests run with each mixture:

*Pencillium funiculosum*
*Penicillium piscarium*
*Aspergillus flavus*
*Aspergillus niger*
*Trichoderma viride*

The incubation period was 21 days, the temperature was 85–95° F., and 85–90 R.H.

Samples were observed at the outset and the extent of growth observed after 1 week, 2 weeks and 3 weeks. When an ethylene/ethyl acrylate copolymer (ratio of 1.0) was used to plasticize a vinyl chloride homopolymer the following results were observed:

| | |
|---|---|
| 1 week | 0 |
| 2 weeks | 0 |
| 3 weeks | 0–1 |

The code used in determining the extent of growth of the mixed fungal inoculum on the vinyl chloride film was as follows:

0=no growth
1=trace growth
2=slight growth, covering up to 25% of specimen
3=moderate growth, covering up to 25-75% of specimen
4=profuse growth, covering 75-100% of specimen
5=profuse growth, covering all of specimen and heavily fruited As a control, by which to compare the foregoing result, the same test was run with a film of polyvinyl which had been plasticized with a fatty acid terminated polypropylene adipate. The results were as follows:

1 week _____ 2
2 weeks _____ 3
3 weeks _____ 3

In summary, it is clear from the foregoing that plasticized resinous compositions formed from homopolymers and copolymers of vinyl chloride and, as the plasticizer, a liquid copolymer of ethylene or propylene and an acrylate made in accordance with the method described in our parent U.S. application 820,625, are far superior in many respects to prior art types of plasticized polymeric vinyl chloride compositions.

We claim:
1. A plasticized resinous composition formed from a polymer of vinyl chloride, selected from the group consisting of homopolymers of vinyl chloride and copolymers of a major portion of vinyl chloride and an ethylenically unsaturated monomer copolymerizable therewith, and, as a plasticizer, a liquid copolymer of an olefin from the class consisting of ethylene and propylene and an acrylate from the class consisting of ethyl acrylate, methyl acrylate, and methyl methacrylate, said copolymer having a viscosity in the range of from H to $Z_5$ for the ethylene-based copolymer and from H to $Z_{10}$ for the propylene-based copolymer, both on the Gardner-Holdt scale, an acid number which does not exceed 3, a molecular weight of between 500 and 1500, and a molar ratio of the olefin to the acrylic monomer from 1 to 3 when ethylene is the olefin and 0.5 to 2.0 when propylene is the olefin, in which ratios the upper limit is a function of molecular weight as expressed by the equations:

(A) Moles of ethylene/mole of acrylic monomer $$=X+\frac{1}{4}\left(\frac{1500}{\text{molecular weight}}\right)$$

where $X=1.75$ for ethyl acrylate and methyl methacrylate and $X=2.25$ for methyl acrylate; and (B) Moles of propylene/mole of acrylic monomer $$=X+\frac{1}{4}\left(\frac{1500}{\text{molecular weight}}\right)$$

where $X=1.0$ for ethyl acrylate and methyl methacrylate and $X=1.25$ for methyl acrylate.

2. The composition of claim 1 in which the acrylic monomer is ethyl acrylate and, when the olefin is ethylene, the value for $X=1.75$.

3. The composition of claim 1 in which the acrylic monomer is methyl methacrylate and, when the olefin is ethylene, the value for $X=1.75$.

4. The composition of claim 1 in which the acrylic monomer is methyl acrylate and, when the olefin is ethylene, the value for $X=2.25$.

5. The composition of claim 1 in which the acrylic monomer is ethyl acrylate and, when the olefin is propylene, the value for $X=1.0$.

6. The composition of claim 1 in which the acrylic monomer is methyl methacrylate and, when the olefin is proplene, the value of $X=1.0$.

7. The composition of claim 1 in which the acrylic monomer is methyl acrylate and, when the olefin is propylene, the value for $X=1.25$.

References Cited by the Examiner
UNITED STATES PATENTS 2,953,541  9/1960  Pecha et al. _____ 260—86.7
3,062,778  11/1962  Van Cleve et al. ____ 260—45.5

MORRIS LIEBMAN, *Primary Examiner.*